United States Patent
Hashimoto

(10) Patent No.: US 7,607,474 B2
(45) Date of Patent: Oct. 27, 2009

(54) AIR-CONDITIONING APPARATUS FOR VEHICLE

(75) Inventor: Tomohiro Hashimoto, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 466 days.

(21) Appl. No.: 11/008,917

(22) Filed: Dec. 13, 2004

(65) Prior Publication Data
US 2005/0126773 A1 Jun. 16, 2005

(30) Foreign Application Priority Data
Dec. 15, 2003 (JP) ............... 2003-416915

(51) Int. Cl.
*B60H 1/00* (2006.01)
(52) U.S. Cl. ............... 165/202; 165/42; 165/43; 236/91 C
(58) Field of Classification Search ........... 165/42, 165/43, 203, 204, 202; 236/91 C
See application file for complete search history.

(56) References Cited
U.S. PATENT DOCUMENTS
4,498,309 A * 2/1985 Kobayashi et al. ............ 165/43

5,676,204 A * 10/1997 Samukawa et al. ........ 236/91 C

FOREIGN PATENT DOCUMENTS
JP 5-124416 A 5/1993
JP 06-320934 A 11/1994

* cited by examiner

*Primary Examiner*—John K Ford
(74) *Attorney, Agent, or Firm*—Foley & Lardner LLP

(57) ABSTRACT

An air-conditioning apparatus for a vehicle, in which a temperature in a vehicle interior is automatically adjusted under a stable driving mode in which a difference between the temperature in the vehicle interior and a set temperature is lesser than a predetermined value or a transitional driving mode in which the difference is larger than the predetermined value so that the temperature in the vehicle interior approaches to the set temperature when an amount of solar radiation in the vehicle interior is one of parameters, the apparatus including a detecting device provided in the vehicle interior and configured to detect the amount of solar radiation, and a correcting device for correcting the amount of solar radiation detected by the detecting means to obtain a corrected amount of solar radiation, the corrected amount of solar radiation being used as a parameter of the amount of solar radiation for adjusting the temperature in the vehicle interior, under the stable driving mode.

2 Claims, 4 Drawing Sheets

AIR-CONDITIONING APPARATUS FOR VEHICLE

CROSS-REFERENCE TO THE RELATED APPLICATION

The application claims the priority benefit of Japanese Patent Application No. 2003-416915, filed on Dec. 15, 2003, the entire descriptions of which are incorporated herein by reference.

BACKGROUND OF THE INVENTION

1. Field of the Invention

The present invention relates to an air-conditioning apparatus for a vehicle adapted to execute a temperature adjustment within a vehicle interior according to a difference between a temperature in the vehicle interior and a set temperature, more specifically to an air-conditioning apparatus for a vehicle adapted to execute the temperature adjustment within the vehicle interior in consideration of an amount of solar radiation in the vehicle interior.

2. Description of Related Art

Conventionally, an air-conditioning apparatus used in a vehicle such as an automobile, for example, operates, when a difference between a temperature in a vehicle interior and a set temperature set by an occupant is large, under a transitional driving mode which uses, for example, a great air-blast volume and a blowing air temperature greatly different from the set temperature in order to approach rapidly the temperature in the vehicle interior to the set temperature. The air-conditioning apparatus operates, when the difference is less, under a stable driving mode configured to use, for example, a less air-blast volume and a blowing air temperature close to the temperature in the vehicle interior in order to maintain the temperature in the vehicle interior, because the vehicle interior is already comfortable.

Generally, a temperature to which the occupant feels differs greatly based on an amount of solar radiation contacting with the occupant even in the same temperature in the stable and transitional driving modes. Therefore, the amount of solar radiation in the vehicle interior is adopted as one of parameters for executing adjustment of the temperature in the vehicle interior, in the air-conditioning apparatus (for reference, see JPH5-124416A, pages 1 to 6, FIG. 1).

However, when the amount of solar radiation which is one of the parameters for executing the adjustment of the temperature in the vehicle interior changes rapidly and greatly as in an entrance and an exit of a tunnel, for example, the air-blast volume, the blowing air temperature and so on change rapidly. In this way, when the air-blast volume, the blowing air temperature and so on change rapidly, the occupant has felt uncomfortable in the stable driving mode.

SUMMARY OF THE INVENTION

The present invention has been made in view of the above problems in the prior art and an object thereof is to provide an air-conditioning apparatus capable of executing an adjustment of temperature in a vehicle interior to increase comfort of an occupant even if an amount of solar radiation which is one of parameters for the adjustment of the temperature in the vehicle interior changes rapidly.

To accomplish the above object, according to an air-conditioning apparatus in an aspect of the present invention, the temperature in the vehicle interior is automatically adjusted under a stable driving mode in which a difference between the temperature within the vehicle interior and a set temperature is lesser than a predetermined value or a transitional driving mode in which the difference is larger than the predetermined value so that the temperature in the vehicle interior approaches to the set temperature when an amount of solar radiation in the vehicle interior is one of parameters.

The air-conditioning apparatus comprises a detecting device provided in the vehicle interior and configured to detect the amount of solar radiation, and a correcting device for correcting the amount of solar radiation detected by the detecting device to obtain a corrected amount of solar radiation.

The corrected amount of solar radiation is used as a parameter of the amount of solar radiation for adjusting a temperature in the vehicle interior, under the stable driving mode.

DETAILED DESCRIPTION OF THE PREFERRED EMBODIMENTS

Preferred embodiments of the present invention will be explained in detail with reference to the accompanying drawings below.

Figure 1:
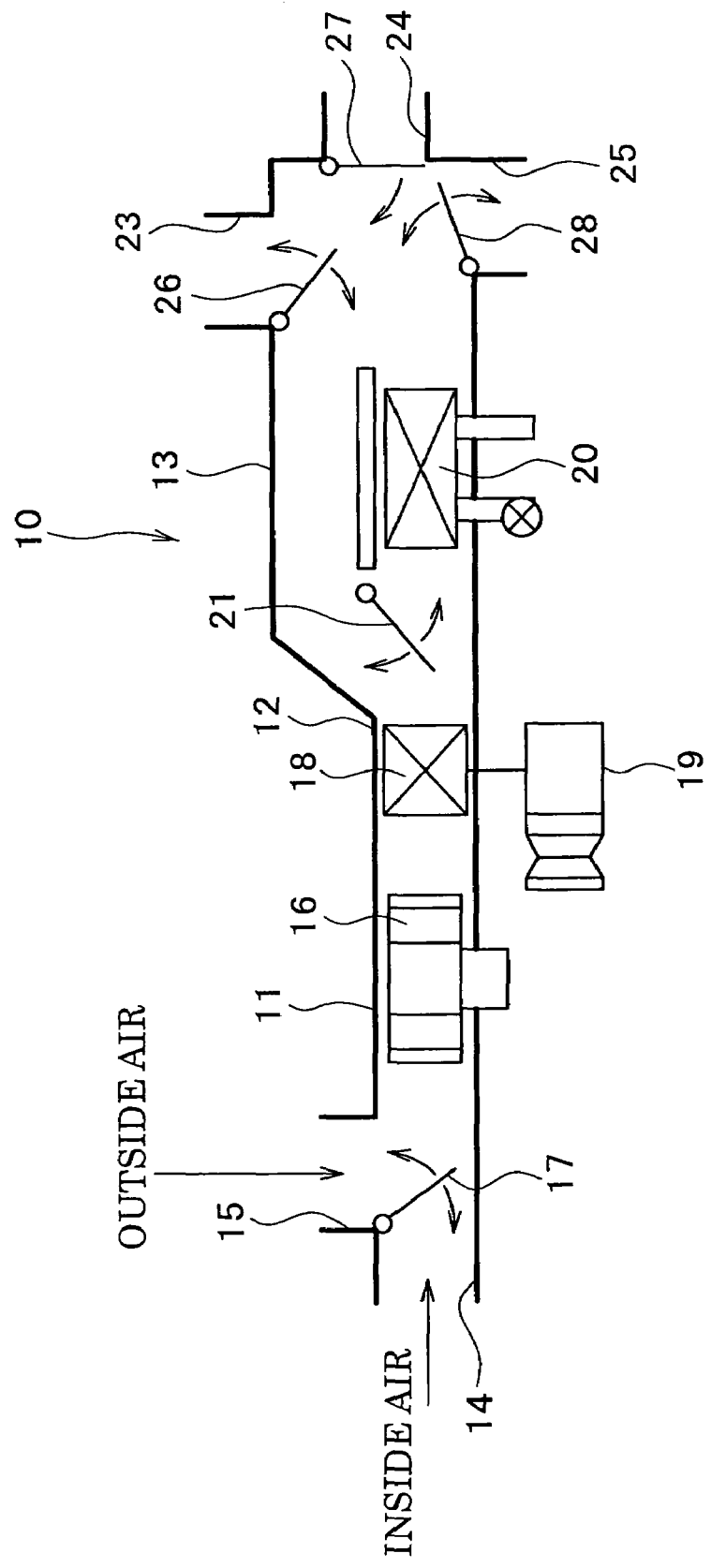
FIG. 1 is a schematic view showing an air-conditioning apparatus according to the present invention.

Referring to FIG. 1, a vehicle to which an air-conditioning apparatus 10 for a vehicle according to the present invention is applied includes an intake unit 11 for introducing selectively therein air outside of a vehicle interior or air inside of the vehicle interior, a cleaning unit 12 for cooling the air introduced into the intake unit 11, and a heater unit 13 for adjusting a temperature of the cooled air from the cleaning unit 12 by warm air, thereafter for introducing the adjusted air in the vehicle interior.

The intake unit 11 includes an inside-air inlet 14 for absorbing inside air, an outside-air inlet 15 for absorbing outside air, and a blowing fan 16. When the blowing fan 16 is operated, the inside air and outside air are selectively introduced in the intake unit 11 in response to an operated position of an intake door 17 provided at a junction of the inlets 14 and 15.

The cleaning unit 12 is provided with an evaporator 18, which is a heat exchanger. When a cooling medium compressed by a compressor 19 having a variable discharge capacity is supplied to the evaporator 18, the evaporator 18 cools the air introduced in the intake unit 11 by heat exchange of the introduced air in the intake unit and the supplied cooling medium.

The heater unit 13 includes a heater core 20, which uses cooling water of an engine as a heat source, for example, and an air-mixing door 21 provided in association with the heater core 20. An actuator 22 is attached to the air-mixing door 21 to drive the air-mixing door 21 (see FIG. 2). The air-mixing door 21 is adapted to adjust a mixing proportion of cold air from the cleaning unit 12 and warm air from the heater core 20 in response to an aperture of the air-mixing door 21, as well known. The air adjusted in an appropriate temperature by adjustment of the mixing proportion can be supplied into the vehicle interior through each of blowing outlets 23, 24 and 25 in response to an aperture of each of doors 26, 27 and 28, which are provided in a defrost-blowing opening 23, ventilator-blowing opening 24 and a blowing opening 25 at foot, respectively.

In the air-conditioning apparatus 10 according to the present invention, a temperature in the vehicle interior is automatically adjusted under a stable driving mode in which a difference between the temperature in the vehicle interior and a set temperature is less than a predetermined value or a transitional driving mode in which the difference is larger than the predetermined value so that the temperature in the vehicle interior approaches to the set temperature when an amount of solar radiation in the vehicle interior is one of parameters.

More specifically, the air-conditioning apparatus 10 is adapted to drive the blowing fan 16 and the evaporator 18, if necessary, in order to approach a temperature Tinc in the vehicle interior to a temperature Tptc set by a temperature-setting part 30 which will be described below, and adjusts the mixing proportion of the cold air and the warm air by opening and closing the air-mixing door 21 as described above.

When the difference between the temperature Tinc in the vehicle interior and the set temperature Tptc is larger than the predetermined value, the air-conditioning apparatus 10 operates under the transitional driving mode having a larger air-blast volume and a higher blowing air temperature than these in the temperature Tinc in the vehicle interior in order to approach rapidly the temperature Tinc in the vehicle interior to the set temperature Tptc.

When the difference is less than the predetermined value, the air-conditioning apparatus 10 operates under the stable driving mode having an air-blast volume lesser than that in the temperature Tinc in the vehicle interior and a blowing air temperature close to the temperature Tinc in the vehicle interior in order to be sufficient to maintain the temperature Tinc in the vehicle interior since the vehicle interior is already comfortable.

In the embodiment, the predetermined value becomes more than 5 when the stable driving mode is switched to the transitional driving mode, and becomes less than 3 when the transitional driving mode is switched to the stable driving mode, if the difference between the temperature Tinc in the vehicle interior and the set temperature Tptc (see step S1 in FIG. 4) is considered as an absolute value. In other words, when the difference between the temperature in the vehicle interior Tinc and the set temperature Tptc is more than 5 in the absolute value, a state is in the transitional driving mode, the transitional driving mode is switched to the stable driving mode when the difference decreases and becomes plus (+) 3° C., a state is in the stable driving mode during +3 to −5° C., the stable driving mode is switched to the transitional driving mode at −5° C. When the difference increases, the transitional driving mode is switched to the stable driving mode at −3° C., a state is in the stable driving mode during −3 to +5° C., the stable driving mode is switched to the transitional driving mode at +5° C. In this way, the reason for giving a hysteresis characteristic to a switching condition so as to change the switching condition based on the original driving condition is to avoid that the switching of driving mode is repeated, and an operation of the air-conditioning apparatus for the vehicle frequently changes.

The air-conditioning apparatus 10 also comprises a detecting device provided in the vehicle interior and configured to detect an amount of solar radiation, and a correcting device for correcting an amount of solar radiation detected by the detecting means to obtain a corrected amount of solar radiation.

Figure 2:
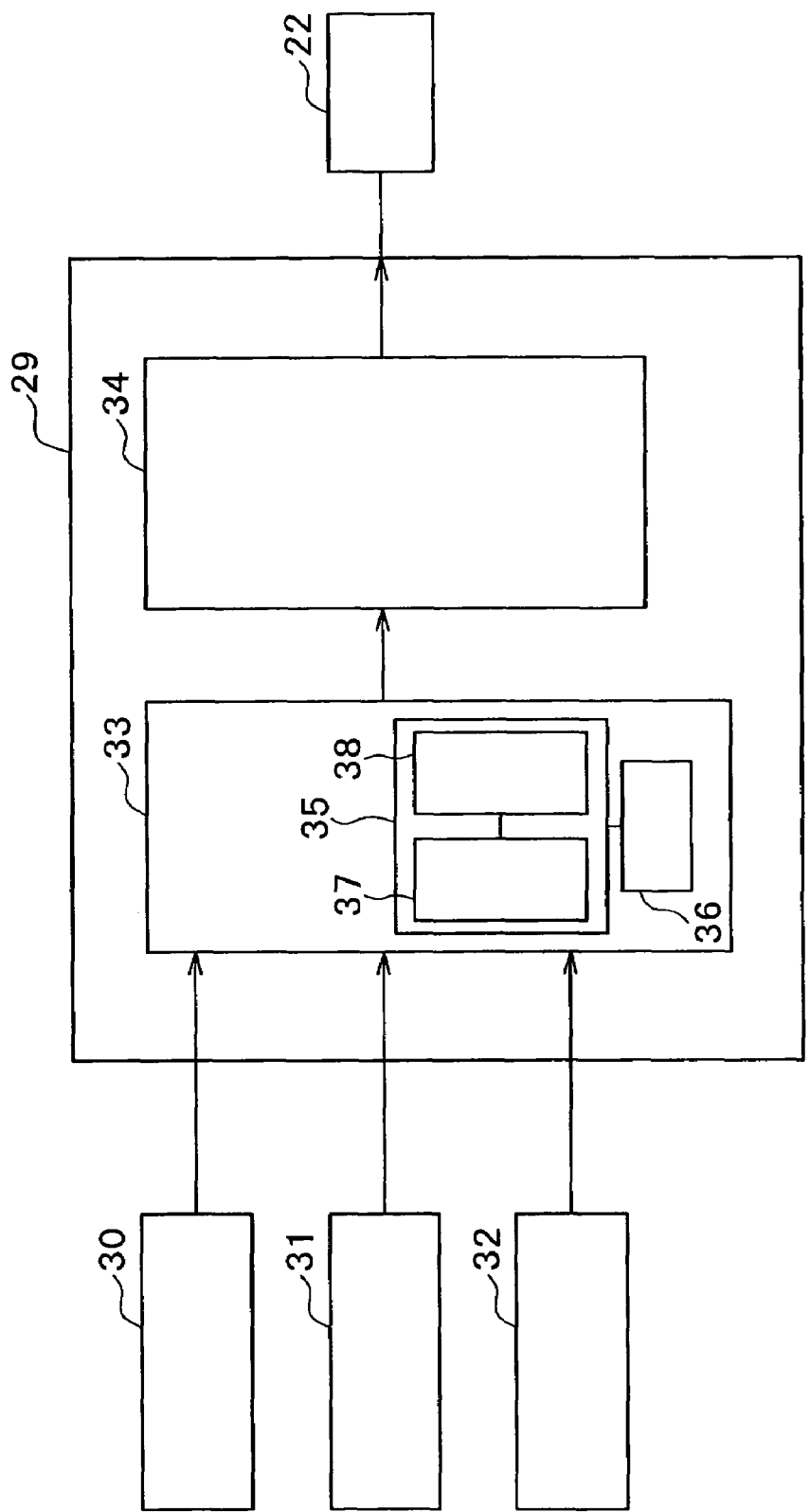
FIG. 2 is a block view showing a controlling device for the air-conditioning apparatus shown in FIG. 1.

The detecting device includes a sensor 32 for detecting an amount of solar radiation in the vehicle interior, and the correcting device includes a controlling part 33, as shown in FIG. 2. The controlling part 33 is provided in a controlling device 29 as schematically shown in FIG. 2. The controlling device 29 includes an air-mixing door-controlling part 34 connected with the controlling part 33. The controlling part 33 is connected with the sensor 32, a sensor 31 for detecting a temperature in the vehicle interior, a temperature-setting part 30 for setting a temperature in the vehicle interior and the air-mixing door-controlling part 34 connected with an actuator 22.

The temperature setting part 30 is provided in a dashboard of the vehicle, for example. An occupant is capable of setting as needed the set temperature Tptc in the vehicle interior by operating the temperature setting part 30. A signal based on the set temperature Tptc is output to the controlling device 29. The sensors 31 and 32 are provided in the dashboard in the vehicle, for example, and output signals in accordance with to a temperature Tinc in the vehicle interior and an amount Q of solar radiation detected, respectively, to the controlling device 29.

The controlling device 29 outputs a signal for driving the air-mixing door 21 to the actuator 22 based on signals input from the temperature-setting part 30, the sensors 31 and 32, and parameters input from the other detecting means such as a sensor (not shown) detecting a temperature out of the vehicle interior, for example. More specifically, when the signals and the parameters are input in the controlling device 29, the controlling part 33 generates a controlling signal based on the signals and the parameters and outputs a driving signal to the air-mixing door-controlling part 34 to control the actuator 22.

The controlling part 33 has an arithmetic circuit 35 for obtaining a corrected amount Qc of solar radiation as described hereinafter, corresponding to an amount Q of solar radiation and a storage part 36 for storing map data representing a relationship between the amount Q of solar radiation and the corrected amount Qc of solar radiation having mutually different characteristic lines, as described hereinafter.

The corrected amount of solar radiation is used as parameters of the amount of solar radiation for adjusting a temperature in the vehicle interior.

The arithmetic circuit 35 has a determining part 37 for judging whether either of the characteristic lines of the map data as described hereinafter is used and a reading part 38 for obtaining the corrected amount Qc of solar radiation as described hereinafter from the map data based on a judging result of the determining part 37.

Next, the above-mentioned map data will be described as follows.

Figure 3:
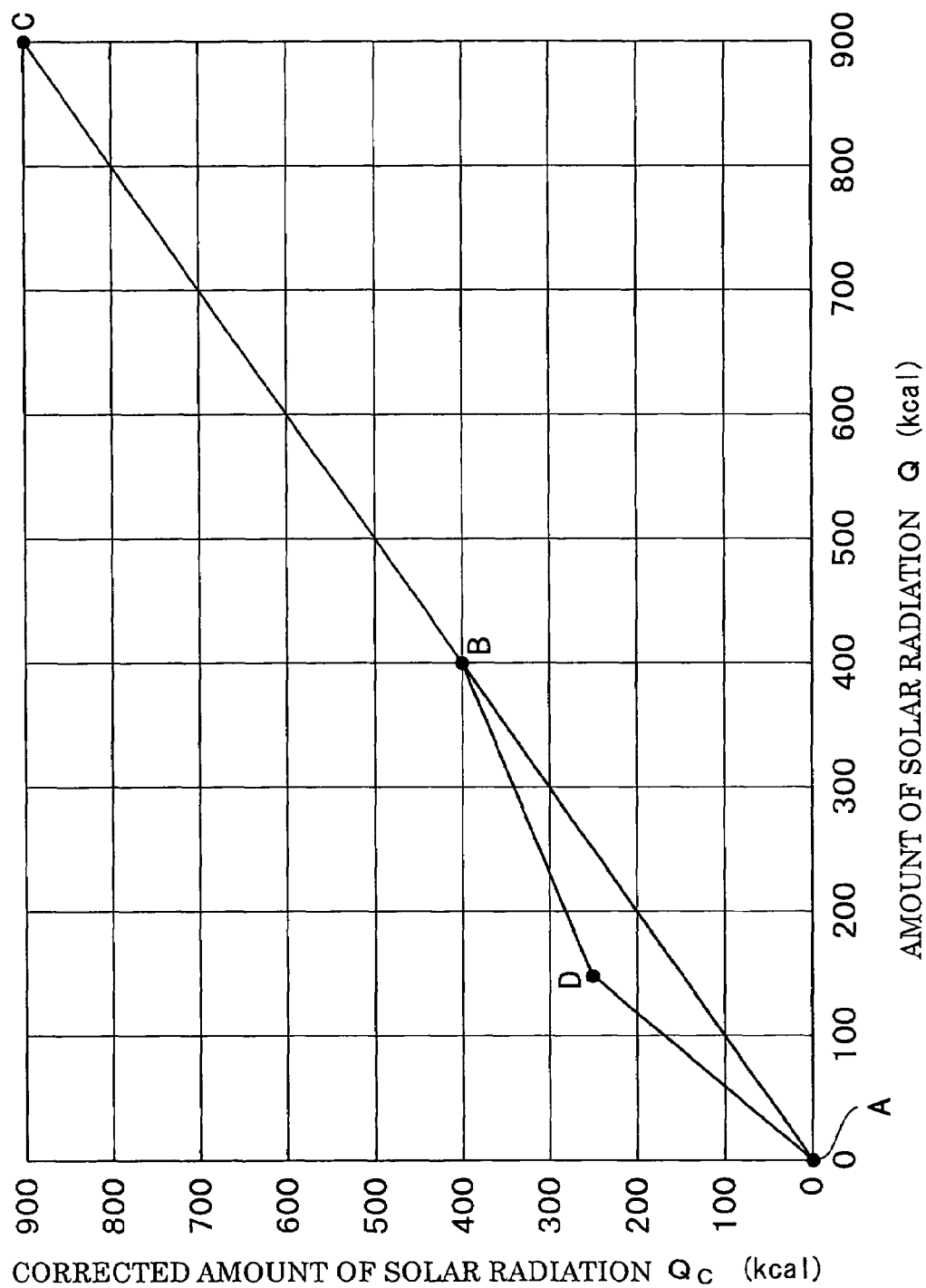
FIG. 3 is a graph showing one example of map data representing a relationship between an amount of solar radiation and a corrected amount of solar radiation.

A horizontal axis in a graph shown in FIG. 3 shows an amount Q (kcal) of solar radiation and a vertical axis shows a corrected amount Qc (kcal) of solar radiation corresponding to an amount Q of solar radiation detected.

The graph shown in FIG. 3 illustrates a first characteristic line indicated by a line A-C in which the corrected amount Qc of solar radiation is in proportion to the detected amount Q of solar radiation and a second characteristic line indicated by lines A-D, D-B, and B-C. The two characteristic lines are indicated by the same line B-C in a range of 400 to 900 kcal of the amount Q of solar radiation, and in this state, the corrected amount Qc is proportional to the detected amount Q of solar radiation.

In a range of 0 to 400 kcal of the amount Q of solar radiation, the characteristic line defined by the lines A-D and D-B different from the line A-B is illustrated in FIG. 3. A point B indicates that the amount Q of solar radiation is 150 kcal, whereas the corrected amount Qc of solar radiation is 250 kcal. In this case, the reason that the corrected amount Qc of solar radiation has a value higher than that in the actually detected amount Q of solar radiation in the range of 0 to 400 kcal of the amount Q of solar radiation is because, in this range, generally a person feels to receive a larger amount of solar radiation than the actually received amount of solar radiation, in other words, feels warmly than the actual amount of solar radiation.

Therefore, when the operation of the air-conditioning apparatus 10 is in the stable driving mode, the characteristic line defined by the lines A-D, D-B and B-C is adopted. This is because, despite the vehicle interior is in a comfortable temperature state for the occupant in the stable driving mode, when the amount Q of solar radiation changes rapidly and greatly, for example, the blast volume, the blowing air temperature and so on change rapidly and the occupant feels uncomfortable, therefore it is required to reduce the rapid change of the blast volume and so on. In the characteristic line adopted in the safe state, for example, even if the amount Q of solar radiation changes rapidly and greatly as in an entrance and an exit of a tunnel, a variation of the corrected amount Qc of solar radiation is lesser than that of the amount Q of solar radiation. In the embodiment, for example, even if the amount Q of solar radiation decreases from 500 kcal to 150 kcal, the corrected amount Qc of solar radiation decreases from 500 kcal to 250 kcal, a difference of decrement between both the amounts Q and Qc of solar radiation is 100 kcal. Therefore, the uncomfortable feeling to the occupant can be reduced by decrement of a degree of change of the blast volume and the blowing air temperature, for example.

Moreover, the comfort to which the occupant feels is not impaired by adjustment of the temperature in the vehicle interior based on the corrected amount Qc of solar radiation in order to allow the occupant to feel the amount Q of solar radiation to which the occupant feels, as the corrected amount Qc of solar radiation.

When the operation of the air-conditioning apparatus 10 is in the transitional driving mode, the characteristic line indicated by the line A-C is employed. This is because the occupant does not feel uncomfortable even if the blast volume, the blowing air temperature and so on change rapidly by rapid and great change of the amount Q of solar radiation, for example, since the great blast volume requires and the blowing air temperature differ significantly from the temperature Tinc in the vehicle interior in the transitional driving mode.

A set temperature Tptc from the temperature-setting part 30, a temperature Tinc in the vehicle interior from the sensor 31 and an amount Q of solar radiation from the sensor 32 are input continuously in the determining part 37 (see FIG. 2). The determining part 37 judges whether a hysteresis of a temperature difference, which subtracts the input temperature Tinc in the vehicle interior from the input set temperature Tptc tends to increase or decrease, selects a temperature range in accordance with the above-mentioned judging result and determines whether the temperature difference subtracted the temperature Tinc from the set temperature Tptc is within the selected temperature range. Thereby, the determining part 37 determines whether the operation of the air-conditioning apparatus 10 is in the stable driving mode or the transitional driving mode and selects the characteristic lines based on the determined result.

The reading part 38 obtains a corrected amount Qc of solar radiation corresponding to the amount Q of solar radiation detected by the sensor 32 from the characteristic line selected by the determining part 37 and then outputs a signal in accordance with the corrected amount Qc of solar radiation to the air-mixing door-controlling part 34 (see FIG. 2).

Figure 4:
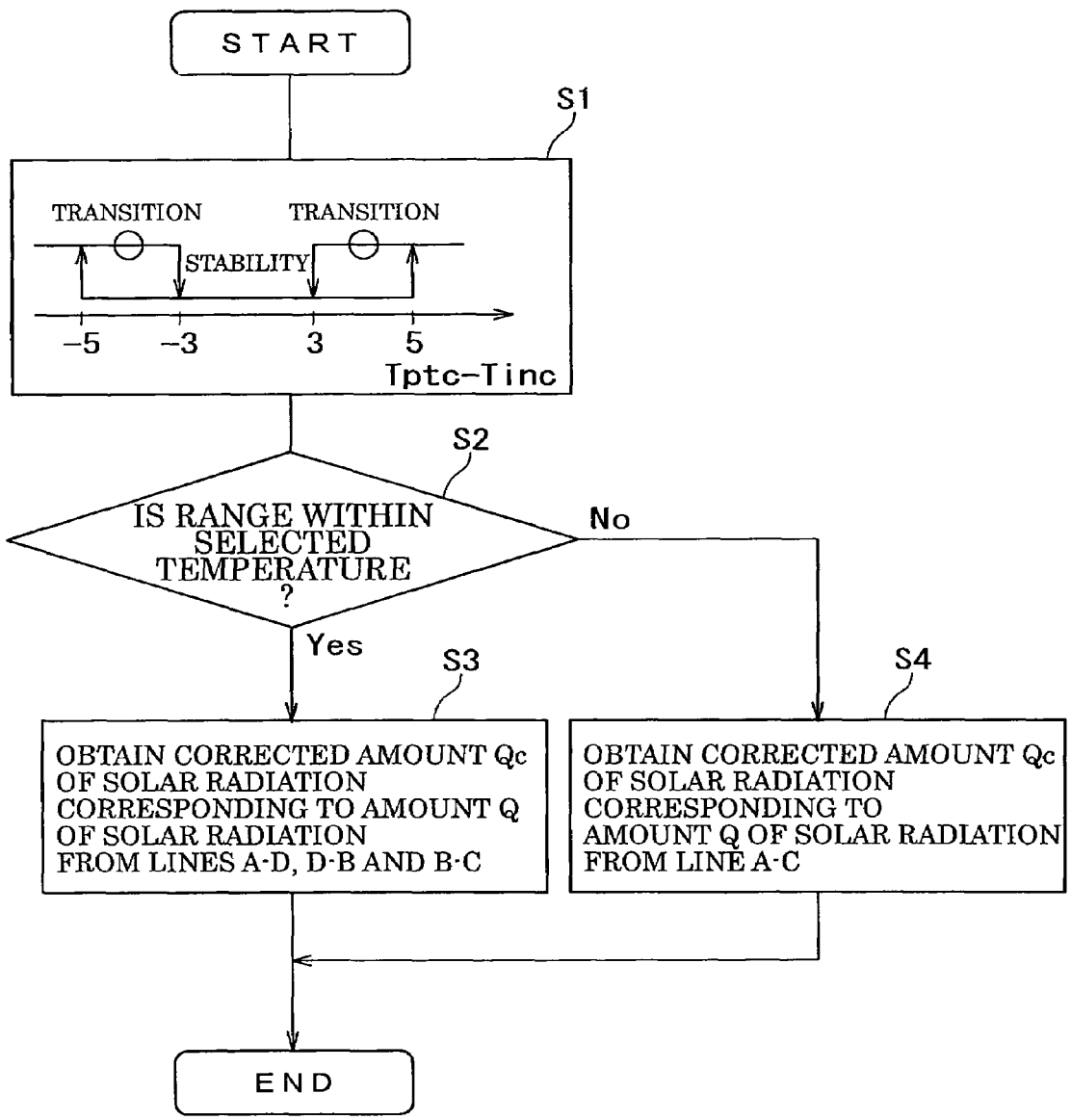
FIG. 4 is a flowchart showing a process for correcting the amount of solar radiation by an arithmetic circuit.

Next, a process for correcting the amount Q of solar radiation by the arithmetic circuit 35 in adjusting automatically the air-conditioning apparatus 10 for the vehicle will be explained referring to a flowchart shown in FIG. 4.

The determining part 37 in the arithmetic circuit 35 judges whether the hysteresis of the temperature difference, which subtracts the temperature Tinc in the vehicle interior from the set temperature Tptc input continuously intends to increase or decrease in order to determine a mode. In the embodiment, because a manner for switching the mode as described above is taken, when the hysteresis of the temperature difference intends to increase, a first temperature range of −5 to +3° C. is selected, when the hysteresis of the temperature difference intends to decrease, a second temperature range of −3 to +5° C. is selected (step S1).

Moreover, the determining part 37 determines whether the temperature difference, which subtracts the temperature Tinc from the set temperature Tptc is within the selected first temperature range or second temperature range. When the determining result is within the temperature range, the determining part 37 determines that the operation of the air-conditioning apparatus 10 is in the stable driving mode, and adopts a characteristic line in accordance with that. In this case, the process is shifted to a step S3. When the determining result is not within the temperature range, the determining part 37 determines that the operation of the air-conditioning apparatus 10 is in the transitional driving mode, and adopts a characteristic line in accordance with that. In this case, the process is shifted to a step S4 (step S2).

When it is determined that the air-conditioning apparatus is in the stable driving mode in the step S2, the reading part 38 obtains a corrected amount Qc of solar radiation corresponding to an amount Q of solar radiation detected by the sensor 32 from the characteristic line adopted in the stable driving mode, the sections A-D, D-B and B-C, and outputs a signal corresponding to the corrected amount Qc of solar radiation into the air-mixing door-controlling part 34 (step S3).

When it is determined that the air-conditioning apparatus is in the transitional driving mode in the step S2, the reading part 38 obtains a corrected amount Qc of solar radiation corresponding to an amount Q of solar radiation detected by the sensor 32 from the characteristic line adopted in the stable driving mode, the sections A-C, and outputs a signal corresponding to the corrected amount Qc of solar radiation into the air-mixing door-controlling part 34 (step S4).

As described above, the amount Q of solar radiation detected by the sensor 32 is corrected to the corrected amount Qc of solar radiation by the arithmetic circuit 35 in accordance with an operating condition of the air-conditioning apparatus 10, and the air-mixing door 21 is driven by a driving signal in consideration of all the parameters (see FIG. 1), hence a blowing air temperature from the defrost-blowing opening 23, the ventilator-blowing opening 24 and the blowing opening 25 at foot can be adjusted.

The air-conditioning apparatus 10 according to the present invention makes it possible to reduce the change of the blowing air temperature according to the variation of the amount Q of solar radiation, even if the amount Q of solar radiation detected by the sensor 32 changes rapidly and greatly when operating in the stable driving mode, because the corrected amount Qc of solar radiation for correcting the amount Q of solar radiation is adopted.

Moreover, because the corrected amount Qc of solar radiation is a value in which the amount Q of solar radiation is corrected in accordance with the feeling of the occupant, it is possible to improve the comfort that the occupant feels by adjusting the temperature in the vehicle interior based on the corrected amount Qc of solar radiation.

In this way, according to the present invention, it is possible to provide an air-conditioning apparatus for a vehicle capable of adjusting a temperature in the vehicle interior without losing the comfort of the occupant, even if an amount of solar radiation which is one of parameters for executing the adjustment of the temperature in the vehicle interior changes rapidly when operating in the stable driving mode.

Meanwhile, although the corrected amount Qc of solar radiation is applied to the driving control of the air-mixing door 21 in the embodiment, for example, it may be applied to the driving control of the blowing fan 16 without being limited to the case of the air-mixing door.

In addition, when the corrected amount Qc of solar radiation is adopted as a parameter, the corrected amount is not gradual or single step as described in the above-mentioned embodiments, for example, the corrected amount is divided into a step every a constant variation thereof, and the parameter may be applied to the step. In this case, even if the driving conditions are switched when the amount Q of solar radiation is directly applied, a set can be made so that the driving conditions are not switched in the corrected amount Qc of solar radiation. More specifically, in FIG. 4, when the constant variation as one step is 200 kcal, if the vehicle drives an avenue and an amount Q of solar radiation changes frequently during 200 kcal to 400 kcal by trees, if the amount Q of solar radiation is directly applied, the driving conditions are switched, but if the corrected amount Qc is applied, because the variation is less than 200 kcal, the driving conditions are not switched. Consequently, even if the amount Q of solar radiation is frequently changes, for example, the blast volume and the blowing air temperature do not change, therefore the occupant does not feel uncomfortable.

The map data shown in FIG. 3 is one example of a relationship between the amount Q of solar radiation and the corrected amount Qc of solar radiation, the present invention is not limited to the example.

Furthermore, the characteristic line showing the corrected amount Qc of solar radiation, which is not proportional to the amount Q of the solar radiation is used when in the stable driving mode, but it may be used when in the transitional driving mode. In the above-mentioned embodiments, although the condition switching from the stable driving mode to the transitional driving mode is more than 5 and the condition switching from the transitional driving mode to the stable driving mode is less than 3, the present invention is not limited to the example, various conditions can be selected.

Although the preferred embodiments of the present invention have been described, the present invention is not limited to these embodiments, various changes and modifications can be made to the embodiments.

What is claimed is:

1. An air-conditioning apparatus for a vehicle, in which a temperature in a vehicle interior is automatically adjusted under a stable driving mode in which a difference between the temperature in the vehicle interior and a set temperature is lesser than a predetermined value or a transitional driving mode in which the difference is larger than the predetermined value so that the temperature in the vehicle interior approaches to the set temperature when an amount of solar radiation in the vehicle interior is one of parameters, the air-conditioning apparatus comprising:
a detecting device provided in the vehicle interior and configured to detect the amount of solar radiation in the stable driving mode; and
a correcting device for correcting the amount of solar radiation detected by the detecting device and configured to obtain a corrected amount of solar radiation which is used as a parameter of the amount of solar radiation for adjusting the temperature,
wherein the correcting device includes a storage part for storing data in which a relationship between the amount of solar radiation detected by the detecting device and the corrected amount of solar radiation corresponding to the detected amount of solar radiation is provided by mutually different characteristic lines, and an arithmetic circuit for obtaining the corrected amount of solar radiation corresponding to the amount of solar radiation detected by the detecting device based on the data,
wherein the arithmetic circuit includes:
a determining part for determining which of the characteristic lines is used based on a temperature hysteresis of the set temperature and the temperature in the vehicle interior and on an absolute value of a difference between the set temperature and the temperature in the vehicle interior; and
a reading part for obtaining the corrected amount of solar radiation from the data based on a determined result of the determining part,
wherein the determining part is configured to determine which of the stable driving mode or the transitional driving mode is used by determining whether the temperature hysteresis tends to increase or decrease, selecting a temperature range in response to the determined result, and determining whether the temperature difference between the set temperature and the temperature within the vehicle interior is within the selected temperature range.

2. The air-conditioning apparatus for a vehicle according to claim 1 wherein the detecting device includes a sensor for detecting the amount of solar radiation in the vehicle interior.

* * * * *